Feb. 2, 1960    R. MOLL    2,923,105
ADJUSTABLE STOP MEANS FOR THE CONTROL SHAFT OF A MACHINE TOOL
Filed April 1, 1957    2 Sheets-Sheet 1
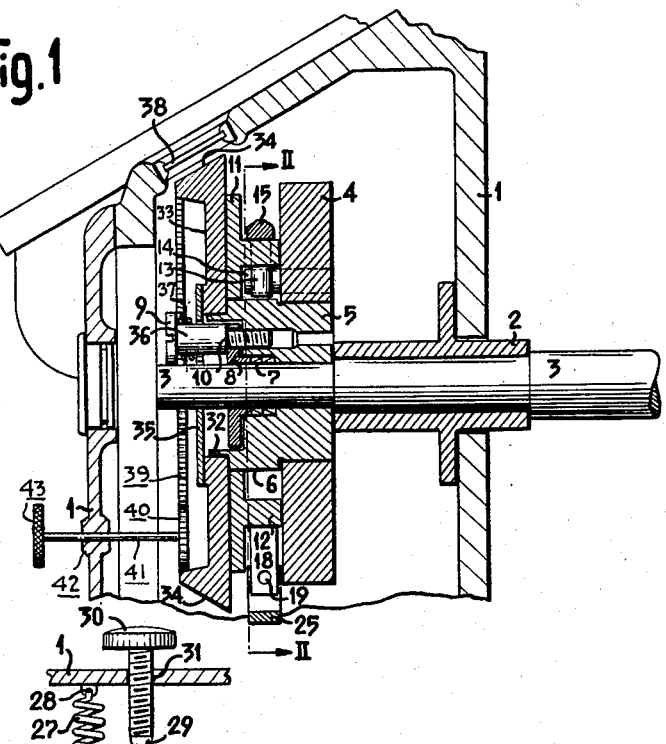
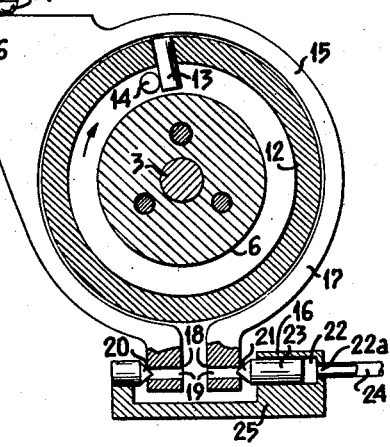
INVENTOR
ROBERT MOLL
By United States Patent Office 2,923,105
Patented Feb. 2, 1960

2,923,105

ADJUSTABLE STOP MEANS FOR THE CONTROL SHAFT OF A MACHINE TOOL

Robert Moll, Geneva, Switzerland, assignor, by mesne assignments, to Societe Anonyme Mipsa, Geneva, Switzerland, a corporation of Switzerland Application April 1, 1957, Serial No. 650,033

Claims priority, application Switzerland April 11, 1956

6 Claims. (Cl. 51—165)

The present invention has for its subject a device with an angularly adjustable stop, particularly for a control shaft of a machine tool. It is characterised in that the device comprises a disc carrying a tappet adapted to serve as a stop for a finger secured angularly to the control shaft, said disc being located co-axially with the control shaft and being capable of being driven in rotation by the said shaft when its finger comes into contact with the tappet, a locking mechanism enabling the angular position of the disc to be fixed and thus of the tapped then forming a stationary stop for the finger secured to the shaft.

One form of construction of the device according to the invention applied to a machine tool is shown diagrammatically and by way of example, in the particular case of a grinding machine, wherein:

Fig. 1 is a view in axial section of a device with an angularly adjustable stop.

Fig. 2 is a view in cross-section on the line II—II of Fig. 1.

Figure 3:
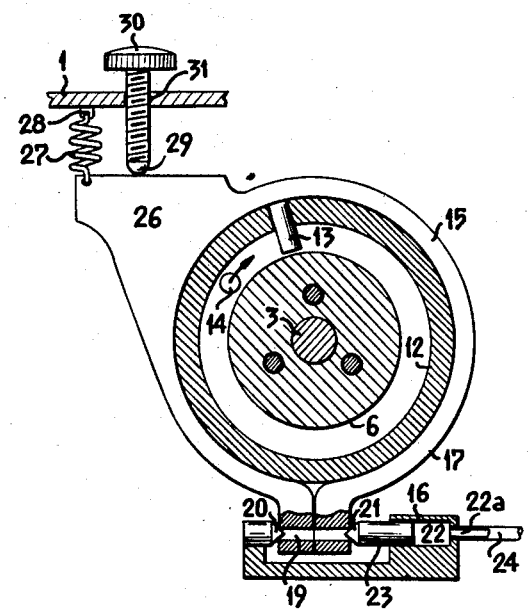
Fig. 3 is a view similar to the preceding one showing the device in the operative position.

The device with an angularly adjustable stop shown in the accompanying drawing is adapted to be applied to a shaft for the control of a machine tool, in the particular case to the shaft for the control of the movements of the wheelhead of a grinding machine. In Fig. 1 is outlined diagrammatically the base 1 of said grinding machine carrying a bearing 2 in which turns one of the ends of the control shaft 3 for the movements of the wheelhead which is not shown. At the end of said shaft 3 is secured a flange 4 secured to a hub 5 provided with a cylindrical portion 6. Said hub 5 is rendered rigidly solid with the shaft 3 by reason of wedging rings 7 forced between the shaft 3 and the internal bore of the hub 5 by a ring 8 pressed against the hub 5 by means of screws 9 with a bearing 10.

On the cylindrical bearing 6 of the hub 5 a disc 11 is located in a manner so as to be capable of turning freely. Said disc 11 has a portion 12 in the form of a drum in the interior of which is secured a tappet 13. Said tappet 13 is adapted to serve as a stop for a finger 14 secured in the flange 4 and, for this reason, secured angularly to the control shaft 3. The disc 11, which is located co-axially to the control shaft 3, may therefore be driven in rotation by the said shaft 3 when the finger 14 comes into contact with the tappet 13.

A locking mechanism is provided for enabling the angular position of the disc to be fixed and thus also that of the tappet 13, thus constituting a stationary stop for the finger 14. Said locking mechanism comprises a clamping part 15 for the part 12 in the form of a drum of the disc 11. The clamping action of said part 15 is controlled from a distance by means of a servo-motor 16 (see Figs. 2 and 3).

As will be seen in Figs. 2 and 3, the clamping part 15 has a part in the form of a split ring 17 fitted around the drum 12 secured to the disc 11. The ends of the said split ring 17 each carry a lug 18 pierced with holes 19. The servo-motor 16 has two gripping jaws 20 and 21 in the form of conical hooking points engaging with the holes 19 of the lugs 18. Said servo-motor 16 comprises a cylinder 22 in which slides a piston 23 of which the outer end constitutes the jaws 21. An orifice 22a is provided at the rear of the cylinder 22 for the seupply of a liquid under pressure by a pipe 24. It is the part 25, in which is bored the cylinder 22, which carries the jaw 20, at its other end. As will be seen in Figs. 2 and 3, said part 25 has the general shape of a stirrup. When liquid under pressure is supplied to the cylinder 22 through the pipe 24, the two jaws 20 and 21 approach one another whilst producing a tightening of the two lugs 18 towards one another. Thus, the ring 17 is deformed resiliently and is tightened around the drum 12 in such a manner as to be locked relatively to this.

The split ring 17 is secured to an arm 26 to which is hooked a spring 27, hooked at the other end at 28 to the framework 1 of the machine. Said spring 27 tends to move the arm 26 into contact with the adjustable stop formed, in the example shown, by the end 29 of a micrometer screw 30 screwed into a threaded bore 31 of the framework 1. Said micrometer screw 30 thus permits of the adjustment and the securing in angular position of the clamping ring 17, carried by the drum 12, relatively to the framework of the machine.

The hub 5 also has a cylindrical extension 32 on which is fitted a disc 33 carrying at its periphery a scale 34. Said disc is held on the cylindrical extension 32 by means of a friction ring 35 threaded around the shaft 3. The cylindrical portion 36 of the bearing screws 9 engages with holes provided in this friction ring 35 and a spring 37 bears against the head of the corresponding screw 9, maintaining the friction ring 35 pressed against the disc 33. As will be understood readily, from the view in Fig. 1, said disc 33 is normally driven in rotation simultaneously with the shaft 3. However, said disc 33 may easily be moved angularly relatively to the shaft 3 precisely by reason of this friction coupling which connects it thereto. A window 38 is provided in the framework 1 of the machine so as to allow of observing therethrough the angular position of the disc 33 carrying the scale 34.

The operation of the angular adjustable stop device hereinbefore described with reference to the accompanying drawings, takes place in the following manner:

When it is assumed that a series of identical parts are to be machined, the first piece is first ground by the usual members. When the desired dimension is reached, the disc 11 and its tappet are locked by passing oil under pressure into the servo-motor 16. The tappet 13 thus constitutes a stop for the finger 14, and the other pieces of the series can be machined rapidly without it being necessary, for each piece, to control the feed stroke of the grindstone, this being limited automatically by the stop 13. When the stop 13 is locked by the clamping device 15—25, the shaft 3 can then only effect a slight angular movement less than 360°, as, after having effected this movement, its finger 14 comes into contact with the tappet 13 held stationary by the clamping ring 17. From the foregoing it will be seen that the forward movement of the wheelhead towards a given side, is determined by the tappet stop 13. The scale 34 permits of easily marking the value of the dimension at which it is desired to effect the stopping of the advance movement of the wheelhead. It is to be observed that a gear device permits of producing an angular movement in one direction or the other of the disc 33, for example for moving the O of the graduation 34 opposite an index marked in the window 38. The aforementioned gear device comprises a toothed ring 39 integral with disc 33.

A pinion gear 40, provided with teeth in mesh with the toothed ring 39, is fixed at the inner end of a shaft 41, said shaft being rotatably mounted in a bearing member 42 carried by the base 1. The outer end of shaft 41 has fixed thereto a control knob 43. Rotation of control knob 43 causes a corresponding rotational movement of the disc 33 which can thus be moved to the desired setting on the graduated scale 34.

Numerous modifications in construction may be provided for said device with an angularly adjustable stop.

In the foregoing description the device with the adjustable stop which has been referred to, has been assumed applied to a grinding machine. However, it will be understood that such a device may be applied to any other shaft for the control of a machine tool or even to any other machine.

The device described has the great advantage of permitting of positioning a stop from a distance by reason of the servo-motor 16 (which may be replaced by any other hydraulic, pneumatic or electric servo-motor) and of having a possibility of fine correction of the position of said stop, by reason of the micrometer screw 30.

I claim:

1. In a machine tool having a framework, and a control shaft rotatably mounted in said framework, a device having an angularly adjustable stop for regulating said control shaft, said device comprising, a disc carrying a tappet adapted to serve as a stop for a finger secured angularly to said control shaft, said disc being located co-axially with said control shaft and being capable of being driven in rotation by the said shaft when its finger comes into contact with said tappet, a locking mechanism enabling the angular position of said disc to be fixed and thus also fix the angular position of said tappet, said tappet thereby forming a stationary stop for said finger secured to said shaft, said locking mechanism including a clamping member for said disc and a remotely controlled servo-motor for actuating said clamping member.

2. A device according to claim 1, including means for adjusting and securing said clamping member relative to the framework of the machine tool.

3. A device according to claim 2, wherein said clamping member has a part in the form of a split ring engaged around a corresponding part of said disc, the servo-motor being secured to the ends of the said split ring so as to produce the clamping of said split ring on said disc when said servo-motor comes into operation.

4. A device according to claim 3, wherein the ends of the said split ring each carry a lug, the servo-motor having two clamping jaws hooked to the said lugs respectively.

5. A device according to claim 4, wherein said servo-motor comprises a cylinder having a piston slidable therein, the supplying of liquid under pressure into said cylinder producing said closing of said clamping jaws, the split ring forming a return spring for urging the servo-motor into inoperative position when the cylinder is set to exhaust.

6. A device according to claim 5, wherein said split ring is secured to an arm urged by a spring into contact with a stop adjustable by a micrometer screw, the arrangement being such as to permit adjustment and fixing in position of said clamping member relatively to the framework of said machine tool.

References Cited in the file of this patent

UNITED STATES PATENTS

| | | |
|---|---|---|
| 1,726,487 | Hoellrigl | Aug. 27, 1929 |
| 1,929,214 | Plantinga | Oct. 3, 1933 |